H. D. PENNEY.

MASK FOR AUTOMOBILE LAMPS.

APPLICATION FILED FEB. 6, 1909.

2 SHEETS—SHEET 1.

Reissued June 29, 1909.

APPLICATION FILED MAY 24, 1909.

12,983.

Witnesses:
W. G. Fuss.
F. E. Boyce.

Inventor:
Harold D. Penney,
By his Attorney,
Chester A. Weed.

H. D. PENNEY.

MASK FOR AUTOMOBILE LAMPS.

APPLICATION FILED FEB. 6, 1909.

Reissued June 29, 1909. APPLICATION FILED MAY 24, 1909. 2 SHEETS—SHEET 2.

12,983.

Witnesses:
C. C. Tuss
A. B. Mattingly.

Inventor:
Harold D. Penney,
By his Attorney,
Chester A. Weed

UNITED STATES PATENT OFFICE.

HAROLD D. PENNEY, OF BROOKLYN, NEW YORK, ASSIGNOR OF ONE-HALF TO CHESTER A. WEED, OF BROOKLYN, NEW YORK.

MASK FOR AUTOMOBILE-LAMPS.

No. 12,983. Specification of Reissued Letters Patent. Reissued June 29, 1909.

Original No. 921,449, dated May 11, 1909, Serial No. 476,369. Application for reissue filed May 24, 1909. Serial No. 498,090.

*To all whom it may concern:*

Be it known that I, HAROLD D. PENNEY, a citizen of the United States, residing in New York, borough of Brooklyn, county of Kings, and State of New York, have invented certain new and useful Improvements in Masks for Automobile-Lamps, of which the following is a specification.

This invention relates to improved means for preventing the glare of head-lights and search-lights,—particularly of automobile head-lights and search-lights, the object of the improvement being to provide improved means which when in place will effectively mask and intercept the upward rays of light so as to prevent the blinding glare of the light from bewildering pedestrians or drivers of approaching vehicles, and which means will be simple in construction and inexpensive to manufacture and also may be readily detachable if preferred.

A further object of the improvement is the provision of an improved mask or hood particularly adapted for attachment exteriorly of the front glass of a head-light or search-light, and which is shiftable with the lamp door, whereby access to the interior of the lamp through the door way is not interfered with.

Figure 2:
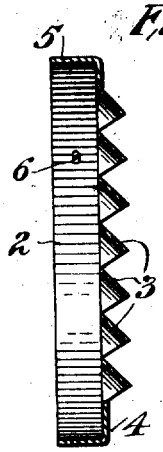
Figure 1:
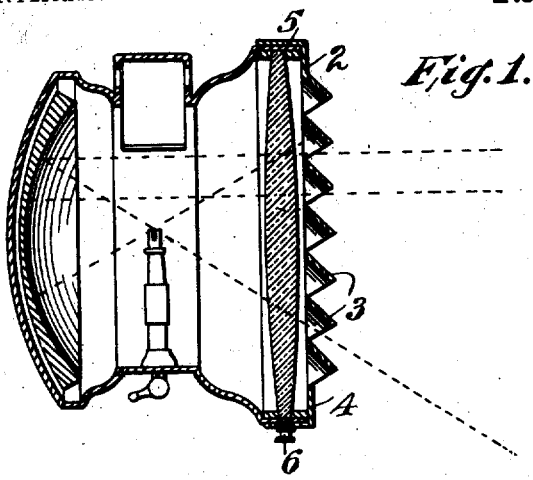
Figure 3:
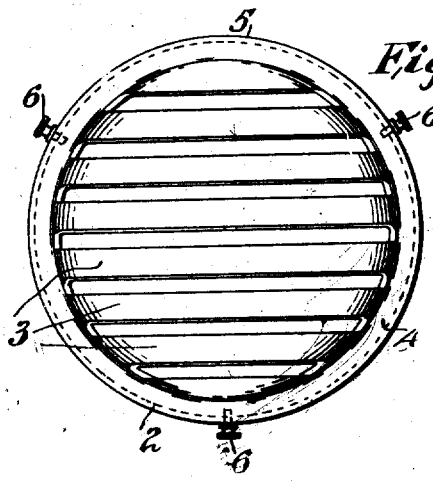
Figure 4:
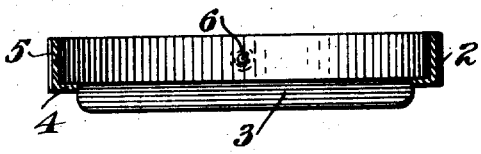
Figure 5:
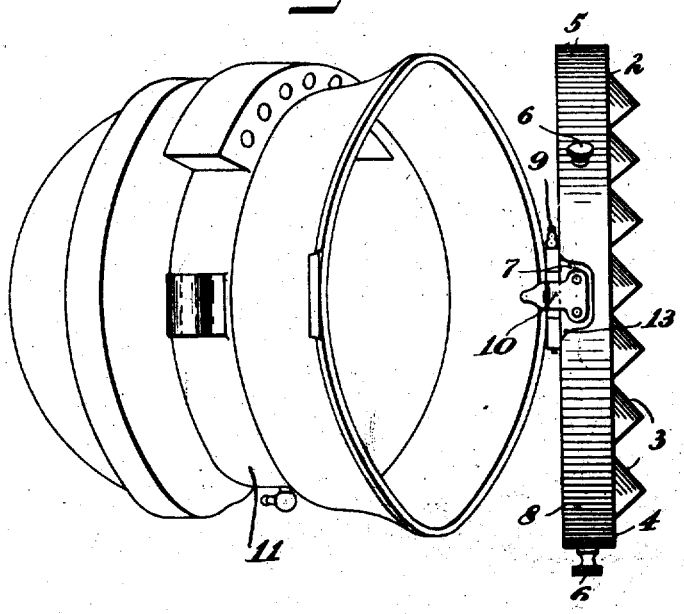

In the drawings accompanying and forming part of this specification, Figure 1 is a vertical sectional view of a head-light with this improved light-ray-intercepting means attached thereto in front of the front door glass thereof; Fig. 2 is a sectional view of this improved mask or hood detached; Fig. 3 is a front view of this improved mask or hood; Fig. 4 is a horizontal sectional view of this improved mask or hood; and Fig. 5 is a perspective view of a motor vehicle lamp with the door partly swung open and with the mask attached thereto.

Similar characters of reference indicate corresponding parts throughout the different figures of the drawings.

Owing to the blinding glare of automobile head-lights and search-lights, due to the upward rays of light, it is essential that some means be provided which will eliminate the dangerous effects of such light-rays without destroying the power of the light, and to provide a means which will overcome these disadvantages and still not interfere with the downward rays or materially with the horizontal rays is the object of the present improvement. Moreover, it is essential to a practicable means of this kind that it be extremely simple in construction and of a form which will enable it to be readily attachable to lamps as now manufactured without interfering with the accessibility to the interior of the lamp through the front door way thereof.

In the present embodiment of this improvement it comprises a mask or hood 2, which in some forms thereof may be made of a single piece of sheet metal, such as brass, preferably of circular formation to conform to the shape of the door and provided with an opening or openings having a hood or hoods preferably comprising downwardly inclined or depending members or louvers 3, which, in the simplest form of the improvement, may be stamped out of the disk or blank 4 from which the hood or mask is made. These inclined members or louvers 3 are located preferably in parallelism one above another and extend crosswise of the hood or mask.

This improved mask or hood may be attached in various ways, and could even be attached on the interior of the lamp in the rear or in front of the front door glass where this is located in such a manner as to permit this, but in the preferred form thereof it is attached to the exterior of the lamp in front of the glass of the front door, and in the present instance the disk 4 forming the body of the hood or mask is provided with a clamping rim 5 of circular formation adapted to be slipped over the rim of the door or lamp body and secured thereto in any desired manner, as by means of thumb screws 6.

By this improvement, which can be readily attached or detached from the lamp for the purpose of cleaning the same or the glass of the door, it will be readily seen by an inspection of Fig. 1 that the upward rays of light are intercepted while the downward rays of light are not interfered with. Not only this, but when the under surfaces of these inclined light-ray intercepting members are made as reflecting surfaces, by silvering or nickel-plating them, the upward rays of light will to a large extent be deflected downwardly on to the road, thus preventing the dangerous glare so common in automobile search-lights and head-lights.

Of course, when the lamp is unprovided with a shiftable or swinging front door the mask may be attached directly to the front of the lamp, as in Fig. 1, in any suitable manner. By forming the mask in the manner shown and described it is also readily attachable to the door rim 7 of a swinging or shiftable door and can therefore be, as hereinbefore stated, swung with the door 8, see Fig. 5, which door may be hinged as at 9 to the lamp body 11 in any of the usual ways and have any suitable catch 10 for holding the door closed. Thus the mask will not prevent access to the interior of the lamp through the front doorway. Moreover, its attachment to the lamp does not require any change of the lamp parts as ordinarily manufactured in order to attach it. Consequently it may be readily used with lamps as now made. Of course, it is obvious that instead of making it as a separate and detachable member it could be made up as a part of the lamp body or rigidly attached thereto if preferred.

By forming the louvers or downwardly inclined light-ray intercepting members as rigid with the disk or plate, it will be readily perceived that in case of collision these members will act as buffers to a large extent and so protect the glass from injury and breakage.

It will, of course, be understood that the various details may be more or less modified without departing from the spirit or scope of this improvement. For instance, the louvers may be riveted or otherwise attached at their ends, instead of being stamped out, if preferred, and when a door catch of the style shown in Fig. 5 is used the mask rim may be cut away as at 13 to make room therefor.

I claim as my invention:

1. The combination with a lamp of the class described, of a plurality of downwardly inclined stationary members located in front thereof, and one above another for intercepting the upward rays of light and preventing the glare of the lamp.

2. The combination with a lamp of the class described, of a plurality of fixed downwardly inclined members located in front thereof, one above another entirely across the front of the lamp for intercepting the upward rays of light and preventing the glare of the lamp.

3. The combination with a lamp of the class described, of means comprising a plurality of members carried thereby one above another and having normally a downwardly inclined position for intercepting the upward rays of light thereby to prevent the glare of the lamp while permitting the effective passage of the downward rays of light.

4. A motor vehicle lamp having a front glass and provided with means located in front of such glass and permanently positioned to intercept the upward rays of light while permitting the effective passage of the downward rays of light.

5. The combination with a lamp of the class described, of a detachable mask for the front of said lamp, said mask having means for intercepting the upward rays of light and preventing the glare of the lamp while permitting the effective passage of the downward rays of light.

6. The combination with a lamp of the character described having a shiftable door, of means for preventing the glare of the lamp and comprising a mask adapted to be carried by the door for movement therewith and having means located to intercept the upward rays of light.

7. The combination with a lamp of the character described having a shiftable door, of means for preventing the glare of the lamp and comprising a detachable mask adapted to be carried by the door for movement therewith and having means located to intercept the upward rays of light.

8. The combination with a light of the character described having a swinging door, of a mask for preventing the glare of the light and comprising a member located in front of the door for swinging movement therewith and having a plurality of openings across the same and provided over each opening with an overhanging hood adapted to intercept the upward rays of light.

9. A mask for preventing the glare of head- and search-lights comprising a detachable cover adapted to fit over the front or door of the lamp and provided with openings extending crosswise thereof and having over each of said openings an overhanging hood adapted to intercept the upward rays of light.

10. A mask for preventing the glare of head- and search-lights, comprising a member having a plurality of openings across the same and provided over each opening with an outwardly projecting stationary member located to intercept the upward rays of light.

11. A mask for preventing the glare of head- and search-lights, comprising a stamped one-piece member having a plurality of openings across the same and provided over each opening with an overhanging member located to intercept the upward rays of light.

12. A mask for preventing the glare of head- or search-lights, comprising a detachable member having a plurality of openings across the same and provided over each opening with an overhanging hood located to intercept the upward rays of light, said member having means for attaching it in front of the lamp.

13. A mask for preventing the glare of head- or search lights, comprising a detachable member substantially conforming to the shape of the lamp front and having a plurality of openings across the same, and provided over each opening with an overhanging hood to intercept the upward rays of light, said member having means for attaching it in front of the lamp and including a rearwardly extending rim.

14. A mask for preventing the glare of head- and search lights, comprising a stamped detachable member having a plurality of openings across the same and provided over each opening with an outwardly projecting hood one overlapping another and located to intercept the upward rays of light, said member having means for attaching it to a lamp.

HAROLD D. PENNEY.

Witnesses:

RALPH L. SCOTT,

WILLARD H. HARTING.